(No Model.)
H. L. HALL.
MUD GUARD FOR BICYCLES.
No. 590,980. Patented Oct. 5, 1897.
Fig. 1
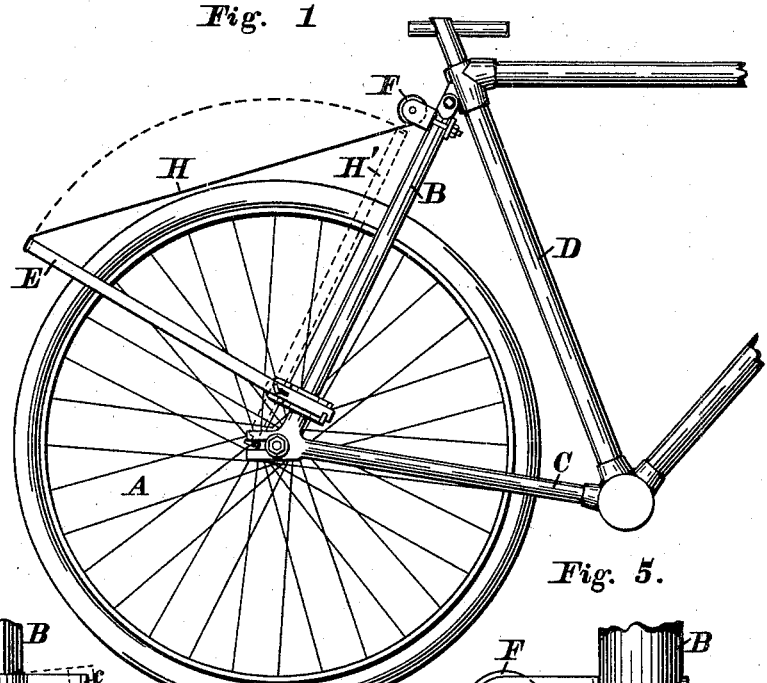
Fig. 2.
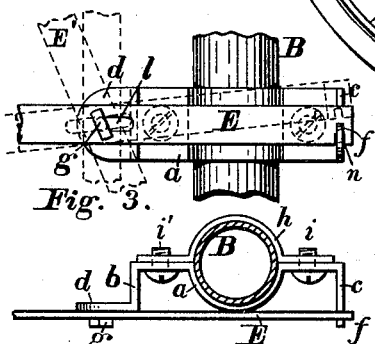
Fig. 3.
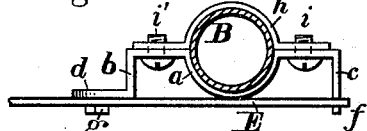
Fig. 4.
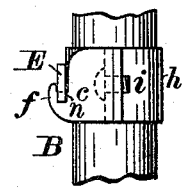
Fig. 5.
Fig. 6.
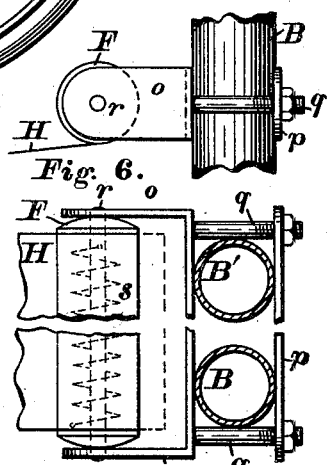
Fig. 7.
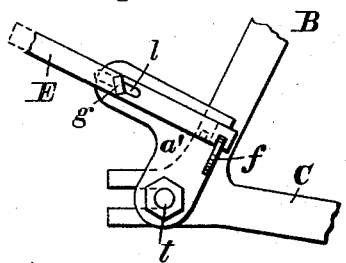
Fig. 8.
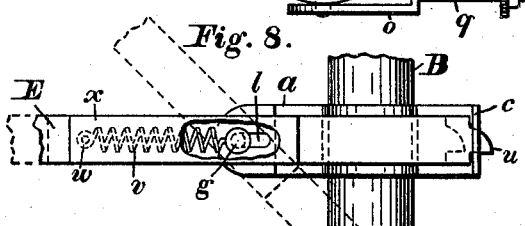
WITNESSES:
G. S. Dey.
L. H. Selden.
INVENTOR:
Herbert L. Hall.
By Geo. B. Selden, atty.
THE NORRIS PETERS CO., PHOTO-LITHO., WASHINGTON, D. C.

UNITED STATES PATENT OFFICE.

HERBERT L. HALL, OF ROCHESTER, NEW YORK, ASSIGNOR TO THE HALL-SHONE COMPANY, OF SAME PLACE.

MUD-GUARD FOR BICYCLES.

SPECIFICATION forming part of Letters Patent No. 590,980, dated October 5, 1897.

Application filed March 22, 1897. Serial No. 628,576. (No model.)

*To all whom it may concern:*

Be it known that I, HERBERT L. HALL, a citizen of the United States, residing at Rochester, in the county of Monroe, in the State of New York, have invented certain Improvements in Mud-Guards for Bicycles, of which the following is a specification, reference being had to the accompanying drawings.

My invention relates to certain improvements in mud-guards for bicycles, which improvements are fully described and illustrated in the following specification and the accompanying drawings, the novel features thereof being specified in the claims annexed to the said specification.

In the accompanying drawings, representing my improvements, Figure 1 is a side elevation of the rear wheel and part of the frame of a bicycle with my invention attached. Fig. 2 represents the manner of attaching the swinging frame to the upright portion of the bicycle-frame. Fig. 3 is a plan of the same. Fig. 4 is a front elevation of the same. Fig. 5 is a side view of the clamp by which the spring-roller is attached to the frame. Fig. 6 is a plan of the same. Figs. 7 and 8 are detail views of modifications.

In the accompanying drawings, A represents the bicycle-wheel, and B, B', C, and D portions of the bicycle-frame.

E is the swinging frame, F the spring-roller, and H the mud-guard strip, which extends over the wheel and protects the rider from mud or dirt. The manner of attaching the swinging frame will be understood from Figs. 2, 3, and 4. The clip $a$ is attached to the upright B and extends in each direction, being bent to form the wings $b$ and $c$, one of which supports the lip $d$ and the other the hook $f$. A pin $g$, inserted in the lip $d$, serves as a pivot, on which the arm E swings.

$h$ is a clamp-plate by which the clip $a$ is attached to the frame B by means of the screws or bolts $i$ $i'$. A slot $l$ is made in the arm E, through which the pin or screw $g$ passes. The arm E is provided on its lower side near its forward end with the notch $n$, Fig. 2, which engages with the hook $f$, as indicated in Figs. 2 and 4, and retains the swinging frame in position, as shown in Fig. 1, with the strip H extended above the wheel. It will be understood that the uprights B B' on opposite sides of the wheel are each provided with clips like $a$, with which the forward ends of the swinging frame engage, each clip being turned outward, as indicated in Fig. 3.

The spring-roller F is attached to the uprights B B' in any suitable manner—such, for instance, as the clip $o$, clamp-plate $p$, and bolts and nuts $q$. (Shown in Figs. 5 and 6.) The forward end of the strip H is attached to the roller F, which revolves freely on the pin $r$, being provided in its interior with the spring $s$, one end of which is attached to the pin and the other to the roller. The spring rotates the roller and causes the strip to wind up thereon when the frame E is detached from the clips and folded up into the position H'. (Shown by the dotted lines in Fig. 1.) The bolts and nuts $q$ permit the removal of the clip and roller from the uprights, and the frame can also be removed by turning it into the position indicated by the dotted lines E' in Fig. 2, in which condition the flat head on the pin $g$ comes in line with the slot $l$, and the swinging frame can be entirely taken off of the bicycle.

When the rider desires to fold up my improved mud-guard, he depresses the outer end of the swinging frame E, thereby detaching the notch $n$ from the hook $f$, and then on drawing the frame outward it will slide on the pins $g$ as far as the slot $l$ will permit, in which position the forward ends of the frame will swing inside or behind the hooks $f$, the roller F will wind up the strip H, and the frame can be folded up to the position indicated at H'. To again extend the mud-guard, the operations just described are repeated in reverse order, or the frame may be simply turned outward with the pin $g$ in the outer ends of the slots $l$, in which case the ends of the frame will spring outward over the hooks $f$, the outer edges of which are inclined or rounded for this purpose, as indicated in Fig. 4. The frame E, as shown, consists of a flat bar of metal bent into U shape, but it will be obvious that it may be made of round wire or that the slots or notches may be made in separate pieces attached to it. The spring-roller F may also, if preferred, be attached to the outer end of the frame in any suitable or preferred way.

In a modification shown in Fig. 7 the clip $a'$ is attached directly to the axle of the wheel by a nut $t$ or other suitable device. The construction in other respects remains the same, the pin $g$ and hook $f$ being employed on the clip $a'$.

In another modification the wing $c$ is perforated and the end of the arm E is provided with a lug or projection $u$, which engages in the perforation to hold the arm in place, the spring $v$ being employed to maintain the engagement. This spring $v$, as shown, is attached at one end to the pin $g$ and at the other to a stud $w$, inserted in the arm, being protected, if desired, by a suitable cover $x$, soldered or otherwise fastened to the arm. It will also be understood that the pins or rivets $g$ may be provided with round instead of flat heads, the clip $a$ itself in this case being taken off the uprights if it is desired to dispense with the mud-guard. It will also be understood that under certain circumstances the slot may be formed in the clip, the pin being fastened in the frame and engaging in the slot in the clip.

My improved mud-guard may be applied to the front wheel of a bicycle or to the wheels of any other type of vehicle. A curved or folding frame may be employed underneath the flexible strip to give it a shape to conform approximately to that of the wheel.

I claim—

1. The combination with the frame of a bicycle, of the spring-roller F, the extensible mud-guard strip H, the slotted swinging and lengthwise-movable frame E, provided with notches $n$, the clips $a\ a$, the pivots $g$ inserted in the clips on one side of the upright and engaging in the slots in the swinging frame, and the hooks $f$ attached to the clips on the other side of the uprights and adapted to engage in the notches in the swinging frame, whereby the frame is adapted to be disengaged from the clips to fold it up by a lengthwise movement on the pivots in the slots, substantially as described.

2. The combination with the frame of a bicycle, of the spring-roller F, the extensible mud-guard strip H, the slotted swinging frame E, provided with notches $n$, the clip $a$ having hooks $f$, and the flat-headed pivots $g$, substantially as described.

HERBERT L. HALL.

Witnesses:
GEO. B. SELDEN,
C. G. CRANNELL.